United States Patent
Bisset et al.

(10) Patent No.: US 8,641,347 B2
(45) Date of Patent: Feb. 4, 2014

(54) COMPRESSION LIMITING NUT

(75) Inventors: John D. Bisset, Lexington, KY (US);
Jason D. Holt, Lexington, KY (US);
Jeremy R. D. Tuttle, Dearborn, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/616,344

(22) Filed: Sep. 14, 2012

(65) Prior Publication Data

US 2013/0094922 A1 Apr. 18, 2013

Related U.S. Application Data

(60) Provisional application No. 61/547,248, filed on Oct. 14, 2011.

(51) Int. Cl.
*F16B 43/00* (2006.01)

(52) U.S. Cl.
USPC .................. 411/533; 411/371.2; 411/512

(58) Field of Classification Search
USPC ............. 411/276, 279, 294, 314, 335, 371.2, 411/372, 432, 512, 533
See application file for complete search history.

(56) References Cited

U.S. PATENT DOCUMENTS

| 4,433,578 | A | * | 2/1984 | Hill | 73/487 |
| 4,790,703 | A | * | 12/1988 | Wing | 411/260 |
| 4,971,498 | A | * | 11/1990 | Goforthe | 411/134 |
| 5,190,423 | A | * | 3/1993 | Ewing | 411/134 |
| 5,203,656 | A | * | 4/1993 | McKinlay | 411/149 |
| 5,827,025 | A | * | 10/1998 | Henriksen | 411/11 |
| 5,902,084 | A | * | 5/1999 | Garcia | 411/432 |
| 5,904,460 | A | * | 5/1999 | Kawabata | 411/155 |
| 6,554,552 | B2 | * | 4/2003 | McKinlay | 411/149 |
| 8,506,223 | B2 | * | 8/2013 | McKinlay | 411/147 |

* cited by examiner

*Primary Examiner* — Roberta Delisle
(74) *Attorney, Agent, or Firm* — Mark W. Croll; Paul F. Donovan

(57) ABSTRACT

A hollow fastening nut assembly including an upper head adapted to engage a wrench or other tightening tool and an integral co-axial, internally threaded lower section of reduced diameter adapted for insertion into an access opening in a fastened component. The lower section acts as a compression limiter. An optional annular disc spring may be disposed about the internally threaded lower section for engagement with the rear surface of the fastened component. A locking structure may be disposed at the exterior surface of the internally threaded lower section to engage the interior of the access opening to lock the nut assembly in place.

20 Claims, 3 Drawing Sheets

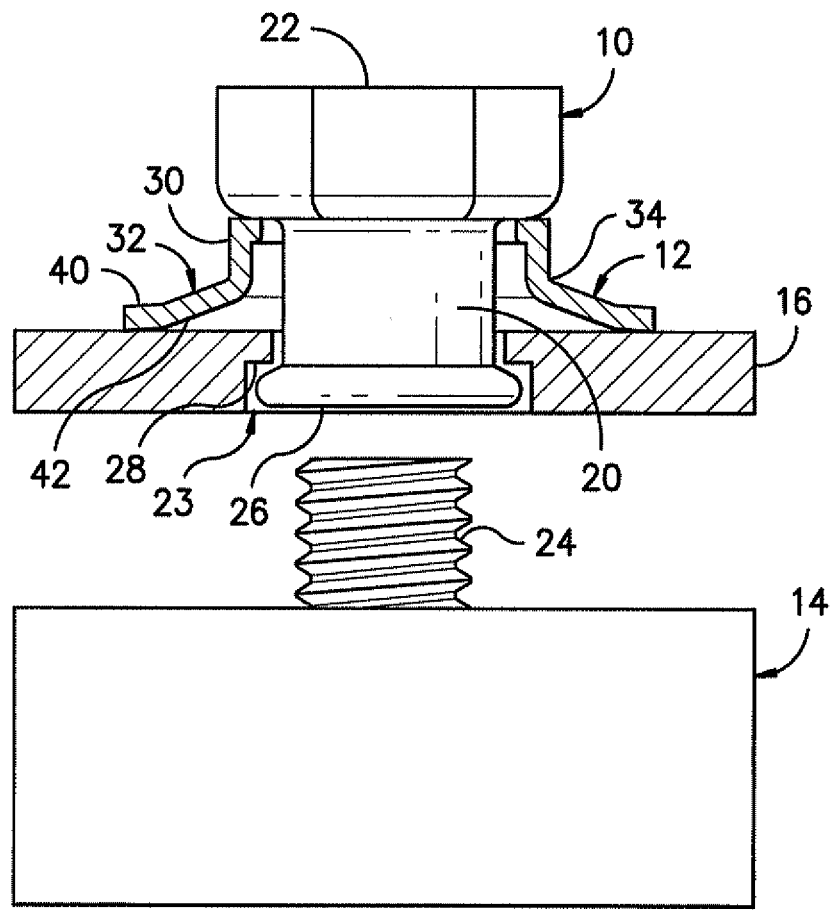
FIG. -1-

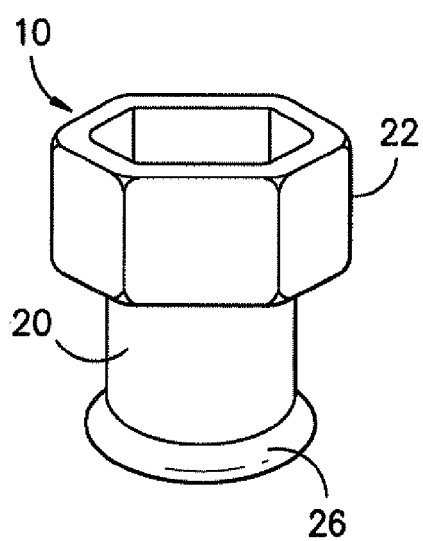
FIG. -2-
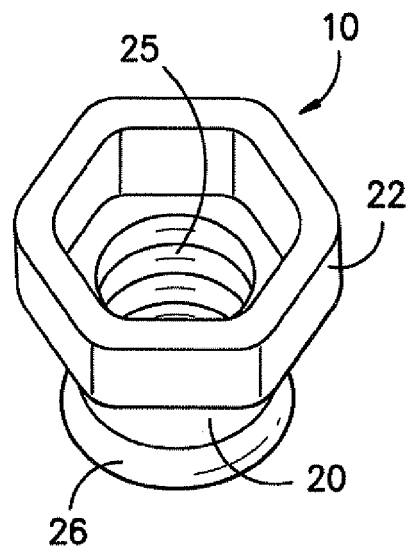
FIG. -3-
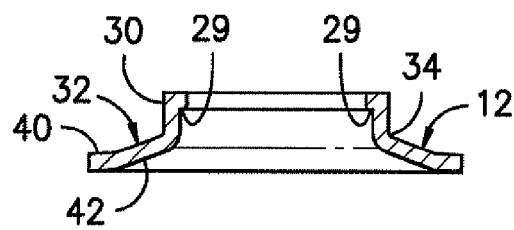
FIG. -4-
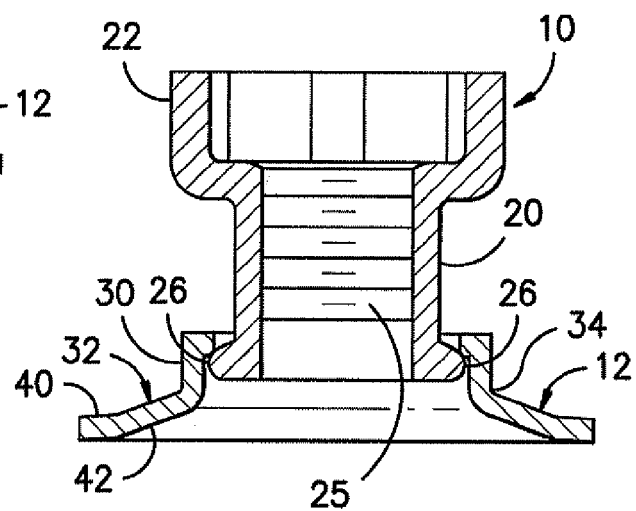
FIG. -5-

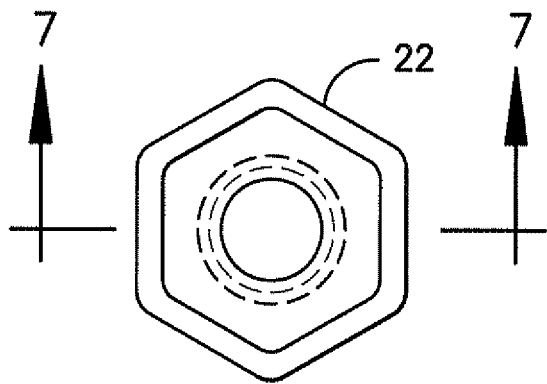
FIG. -6-
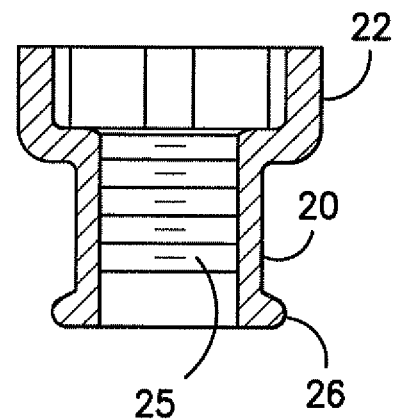
FIG. -7-
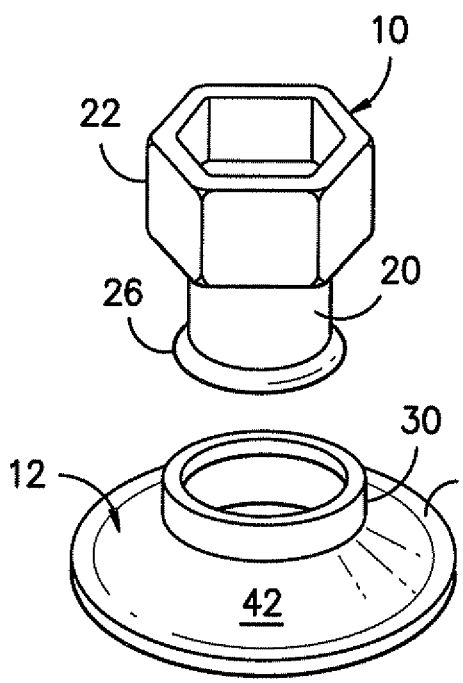
FIG. -8-
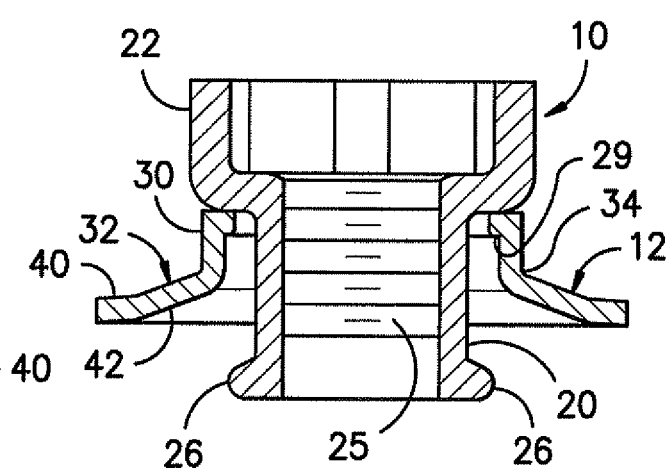
FIG. -9-

COMPRESSION LIMITING NUT

CROSS-REFERENCE TO RELATED APPLICATIONS

This application claims the benefit of, and priority from, U.S. provisional application 61/547,248 filed Oct. 14, 2011. The contents of such prior application are hereby incorporated by reference in their entirety as if fully set forth herein.

FIELD OF THE INVENTION

The present invention relates generally to connection assemblies, and more specifically, to a compression limiting connective nut. The connective nut incorporates an integral compression limiting sleeve feature defining a nipple adapted for insertion in sunken relation within a fastened component.

BACKGROUND

It is known to connect a threaded member in place relative to the surface of a panel or other component (referred to herein as the "fastened component") by extending a threaded bolt or stud portion of the threaded member through a hole in the fastened component and engaging a female nut at the far side of the fastened component. By tightening the nut relative to the threaded bolt or stud portion, the threaded member and the fastened component are held in secure relation to one another. While such an arrangement provides a secure connection, the fastened component may experience a substantial level of compression due to pressure exerted by the nut pressing against the surface of the fastened component. In severe situations, such compression may cause structural or cosmetic damage.

In order to prevent excessive compression, it is known to use supporting sleeve inserts at the interior of the fastening opening. The supporting sleeve acts as a spacer between the nut and the threaded component thereby preventing overtightening and avoiding resultant damage. While such sleeves function well, the sleeve is a separate component which adds complexity and cost to the joining procedure.

SUMMARY OF THE DISCLOSURE

The present disclosure provides advantages and alternatives over the prior art by providing a hollow fastening nut assembly including an upper head adapted to engage a wrench or other tightening tool and an integral co-axial, internally threaded lower section of reduced diameter adapted for insertion into an access opening in the fastened component. The lower section acts as a compression limiter. An optional annular disc spring may be disposed about the internally threaded lower section for engagement with the rear surface of the fastened component. An enhanced diameter locking structure may be disposed at the exterior surface of the internally threaded lower section to engage the interior of the access opening to lock the nut in place.

In accordance with one exemplary construction, the present disclosure provides a compression limiting nut adapted to engage a threaded male member during attachment of a fastened component to a male threaded component. The compression limiting nut includes a unitary metal body of hollow construction including a polygonal head portion adapted to engage a tightening tool and an integral nipple portion extending away from the head portion. The body has an open top and an open bottom with an axial passageway extending along the entire length of the body between the open top and the open bottom. The nipple portion includes interior surface threads extending at least partially along the length of the nipple portion circumferentially about the axial passageway within the nipple portion. The body has a stepped exterior profile in the length dimension, wherein the head portion has an effective outer diameter greater than the outer diameter of the nipple portion. The axial passageway has a stepped configuration with the effective inner diameter of the head portion being greater than the inner diameter of the nipple portion. The head portion has a hollow walled construction with an interior void between perimeter walls defining an upper portion of the axial passageway. An enhanced diameter locking ring projects radially outwardly from the exterior of the nipple portion and is disposed circumferentially about the nipple portion.

The fastening nut of the present disclosure provides numerous advantages including a reduced possibility of compression damage, and reduced material used in the construction of the nut. Other features and advantages of the invention will become apparent to those of skill in the art upon review of the following detailed description, claims and drawings.

BRIEF DESCRIPTION OF THE DRAWINGS

FIG. 1 is a schematic assembly view of a fastening assembly incorporating an exemplary drawn compression limiting nut in accordance with the present disclosure;

FIG. 2 is a schematic side view of a first embodiment of an exemplary compression limiting nut according to the present disclosure;

FIG. 3 is a schematic elevation perspective view of the exemplary compression limiting nut as shown in FIG. 2;

FIG. 4 is a cut-away side view of an exemplary disc spring adapted for disposition about the nipple portion of an exemplary compression limiting nut as shown in FIG. 2;

FIG. 5 is a schematic cut-away view of an exemplary compression limiting nut assembly with the exemplary disc spring of FIG. 4 disposed about the nipple portion of the exemplary compression limiting nut of FIG. 2;

FIG. 6 is a top end view of the exemplary compression limiting nut as shown in FIG. 2;

FIG. 7 is a cross-sectional view taken generally along line 7-7 in FIG. 6.

FIG. 8 is an assembly view illustrating attachment of a disc spring circumferentially about a lower portion of a nut as shown in FIG. 2 to form the nut assembly as shown in FIG. 5; and FIG. 9 is a schematic cross-section illustrating the nut assembly with the attached disc spring in place.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Reference will now be made to the drawings, wherein to the extent possible, like elements are designated by like reference numerals in the various views. Referring now jointly to FIGS. 1-3, a nut 10 of unitary construction formed by drawing or the like is provided. As will be described further hereinafter, the nut 10 may be assembled with an optional disc spring 12 (FIG. 4) of unitary, annular construction disposed circumferentially about a lower portion of the nut 10. Whether or not the disc spring 12 is used, the nut 10 provides the fastening capabilities of a standard nut while providing an integral compression limiting feature. According to the illustrated exemplary construction, the design also allows for capture of the disc spring 12 to permit preassembly and shipment of the nut 10 and disc spring 12 as an integrated assembly. An external ring structure on the nut 10 may also facilitate the ability of the nut 10 to capture itself at the inside of a mating access opening as will be described hereinafter.

As best seen in FIG. 1, the nut 10 permits the secure connection of a male-threaded component 14 to a panel or other fastened component 16. In this regard, it will be understood that while the fastened component 16 is illustrated for ease of understanding as having a substantially uniform construction, such a fastened component may likewise incorporate a profiled or irregular construction if desired. As best seen through joint reference to FIGS. 1-3, in the illustrated exemplary embodiment, the nut 10 has a coaxial stepped construction incorporating a reduced diameter nipple portion 20 defining an internally threaded sleeve and an enhanced diameter head portion 22 having a hexagonal or other suitable tool-engaging polygonal geometry. In this regard, the nipple portion 20 and the head portion 22 cooperatively define the body of the nut 10. By way of example only, and not limitation, the nut 10 may be formed as a unitary structure by drawing draw quality steel or other suitable metal or non-metallic material. As will be appreciated, such a drawing operation may be carried out by a ram press forcing a substantially flat metal blank into a draw cavity to provide the illustrated coaxial construction. Of course, other formation practices such as casting, machining or the like may be used if desired. Regardless of the formation practice used, a substantially hollow unitary structure is formed.

As best seen in FIG. 1, during use the nipple portion 20 may be matedly disposed within an access opening 23 extending through the fastened component 16. In this condition, the head portion 22 is disposed above the side of the fastened component 16 facing away from the male-threaded component 14. A threaded male member 24 such as a bolt or stud with external threads may project outwardly from the male-threaded component 14 to be matedly received within the nipple portion 20. In this condition, the external threads of the threaded male member 24 may engage corresponding interior surface threads 25 at the interior of the nipple portion 20. Accordingly, the threaded male member 24 may be screwed into the nipple portion 20 thereby securing the male-threaded component 14 to the fastened component 16. The nipple portion 20 acts as a compression limiting element that blocks any significant over-tightening.

As will be appreciated, a nut 10 according to the present disclosure provides the features of a captured compression limiter. This represents an improvement over many current systems which require an additional spacer component to limit the nut from over compressing the adjacent component as fastening takes place.

As illustrated, in accordance with one exemplary feature, the compression limiting nut 10 may be configured to be captured and held in place within the access opening 23 in the fastened component 16, thereby reducing the labor or automation required to fasten the system together. By way of example only, as seen in FIG. 1, the access opening 23 in the fastened component 16 may have a stepped construction with a reduced diameter upper segment and an enhanced diameter lower segment to define a shoulder 28 extending circumferentially about the interior of the access opening 23. In the illustrated exemplary construction, an enhanced diameter ring structure 26 may be disposed circumferentially about a lower region of the nipple portion 20 in spaced relation from the head portion 22. In the illustrated construction, the ring structure defines a foot about the terminal end of the nipple portion with a curved surface in the vertical direction as best seen in FIGS. 1 and 5. However, the ring structure may also have other configurations and be positioned at elevations closer to the head portion 22 if desired. The ring structure 26 may be sized to provide a slight initial interference with the upper segment of the access opening 23 in the fastened component 16 as the nipple portion is inserted into the access opening 23. Once the nut 10 is pushed past this initial interference, removal of the nut 10 is then blocked by the shoulder 28 unless intentional force is applied. However, the nut 10 will nonetheless be rotatable relative to the fastened component 16 since the walls at the lower segment of the access opening are spaced apart from the ring structure 26. That is, the effective diameter of the lower segment of the access opening below the shoulder 28 is slightly greater than the effective diameter of the nipple portion 20 with the ring element 26. While a ring structure 26 extending substantially around the full perimeter of the nipple portion 20 may be disable, it is also contemplated that other locking structures such as raised detents and the like positioned circumferentially about the nipple portion may likewise be used in the same manner if desired.

By way of example only, and not limitation, the ring structure 26 may be formed from a slightly compressible material such as plastic or the like. By way of example only, in one exemplary practice, the ring structure may be glass-filled nylon or other polymer heat bonded or otherwise secured to the exterior of the nipple portion 20. However, other materials of construction may be used if desired. By way of example only, and not limitation, the ring structure 26 may be formed integrally with the walls of nipple portion 20 during the formation process. Of course, other locking arrangements may likewise be used.

As illustrated, the nut 10 according to the present disclosure may be open at both the top and the bottom to define an internal passageway of internal stepped construction extending along the entire length. This internal passageway has a relatively wide diameter at the interior of the head portion 22 disposed in substantially coaxial relation to the reduced diameter interior of the nipple portion 20 containing the interior surface threads 25. Thus, it will be understood that the nut 10 is hollow along its entire length. This hollow construction may provide weight advantages when compared to using a nut and standard compression limiter in which a solid nut head typically will contain more material than a drawn nut according to the present disclosure which is hollow along its length. In the present system, a relatively thin walled hexagonal structure may be used at the head portion 22 with very little extra material compared to a conventional nut.

The nut 10 according to the present disclosure may also permit the use of a shorter externally threaded male member 24 compared to a system using a standard nut. In this regard, in prior systems the entire nut and mated threads will typically exist outside the fastened component such that the threaded male member 24 may be required to extend through and beyond the thickness dimension of the fastened component. Conversely, in the design of the present disclosure, the threaded male member 24 need only extend an adequate distance to achieve a secure connection because the internal receiving threads are within the compression limiting nipple portion 20 of the nut 10 which is disposed within the access opening 23 of the fastened component 16.

As indicated previously, the nut 10 may also facilitate connection of a captured disc spring 12. In this regard, by adding a slight interference between the ring structure 26 and the inner diameter of the disc spring 12, the disc spring 12 may be attached and secured loosely in place about the nipple portion 20 by pressing the disc spring 12 past the slightly compressible ring structure 26 and onto the nipple portion 20. Accordingly, the nut 10 and disc spring 12 may be preassembled and shipped as a useable combined assembly (FIG. 5). In the illustrated exemplary construction, the locking interference is provided by a radially inwardly projecting ledge 29 disposed at the interior of the disc spring 12. Of course, other locking interference arrangements may likewise be used if desired. By way of example only, and not limitation, locking interference may be provided by an interior bulge or any other inwardly projecting structure which reduces the effective inner diameter of the disc spring. As will be appreciated, in the assembled condition, the disc spring 12 can slide up and down along the nipple portion 20 but is blocked from becoming disengaged.

Referring now to FIGS. 1, 4, 5, 8 and 9, in accordance with one exemplary practice, the disc spring 12 may have an annular conical construction including an upper neck 30 and an enhanced diameter umbrella flange 32 extending downwardly and radially away from the upper neck 30. By way of example only, and not limitation, the disc spring 12 may be formed as a unitary element from draw quality steel by techniques such as drawing or the like as will be known to those of skill in the art. In this regard, the nut 10 and the disc spring 12 may be formed from the same material. However, different materials may be used if desired. It is contemplated that the use of a disc spring 12 may provide a more consistent load regardless of variations because of temperature and tolerances.

As illustrated, in the exemplary construction the umbrella flange 32 may intersect the upper neck 30 at an elbow 34. As best seen in FIGS. 5 and 8, the umbrella flange 32 may have a substantially dog-leg cross-sectional profile on each side including a distal foot portion 40 defining a substantially flat lower surface and an angled leg portion 42 extending between the distal foot portion 40 and the elbow 34. As will be appreciated, such a construction may facilitate good surface contact between the umbrella flange 32 and fastened component 16 while also allowing flexural deformation of disc spring 12 as compression is applied to upper neck 30. Of course, other spring constructions may be used if desired.

As will be appreciated, during a tightening procedure between the nut 10 and the threaded male member 24, the head portion 22 will be drawn towards the outer surface of fastened component 16. With the disc spring 12 in place as shown in FIG. 1, the upper neck 30 will be placed into compression, thereby causing the umbrella flange 32 to flex outwardly. The applied force is ultimately carried by the foot portion 40 at the perimeter thereby spreading the force substantially uniformly and offsetting effects of contour and temperature variations. Of course even without the disc spring 12 in place, the degree of travel by the head portion 22 towards fastened component 16 will be limited by the threaded engagement between the nipple portion 20 and the threaded male member 24 such that the head portion may be prevented from being forcefully pressed into the outer surface of fastened component 16 thereby avoiding damage.

Of course, variations and modifications of the foregoing are within the scope of the present invention. All dimensions are merely exemplary. Thus, it is to be understood that the invention disclosed and defined herein extends to all alternative combinations of two or more of the individual features mentioned or evident from the text and/or drawings. All of these different combinations constitute various alternative aspects of the present invention.

What is claimed is:

1. A compression limiting nut assembly adapted to engage a threaded male member during attachment of a fastened component to a male threaded component, the compression limiting nut comprising:
   a unitary metal body of hollow construction, the body including a polygonal head portion adapted to engage a tightening tool and an integral nipple portion extending away from the head portion, the body having an open top and an open bottom with an axial passageway extending along the entire length of the body between the open top and the open bottom, the nipple portion including interior surface threads extending at least partially along the length of the nipple portion circumferentially about the axial passageway within the nipple portion, the body having a stepped exterior profile in the length dimension, wherein the head portion has an effective outer diameter greater than the outer diameter of the nipple portion and wherein the axial passageway has a stepped configuration with the effective inner diameter of the head portion being greater than the inner diameter of the nipple portion and wherein the head portion has a hollow walled construction with an interior unthreaded void between perimeter walls defining an upper portion of the axial passageway; and
   an enhanced diameter locking structure projecting radially outwardly from the exterior of the nipple portion circumferentially about the nipple portion.

2. The compression limiting nut assembly as recited in claim 1, wherein the body is drawn steel.

3. The compression limiting nut assembly as recited in claim 1, wherein the nipple portion is substantially cylindrical.

4. The compression limiting nut assembly as recited in claim 3, wherein the enhanced diameter locking structure is a ring comprising polymeric material secured to the exterior of the nipple portion.

5. The compression limiting nut assembly as recited in claim 4, wherein the enhanced diameter locking structure comprises plastic.

6. The compression limiting nut assembly as recited in claim 1, wherein a metal disc spring is disposed in circumferential relation about the nipple portion at a position between the head portion and the enhanced diameter locking structure.

7. The compression limiting nut assembly as recited in claim 6, wherein the disc spring is drawn steel.

8. The compression limiting nut assembly as recited in claim 7, wherein the disc spring has an annular conical construction including an upper neck and an enhanced diameter umbrella flange extending downwardly and radially away from the upper neck.

9. The compression limiting nut assembly as recited in claim 8, wherein the umbrella flange includes an interference structure defining the effective inner diameter for the disc spring which is less than the effective outer diameter formed by the enhanced diameter locking structure.

10. The compression limiting nut assembly as recited in claim 9, wherein the enhanced diameter locking structure comprises a polymeric material secured to the exterior of the nipple portion.

11. The compression limiting nut assembly as recited in claim 10, wherein the enhanced diameter locking structure comprises plastic.

12. The compression limiting nut assembly as recited in claim 1, wherein the nipple portion is substantially cylindrical.

13. The compression limiting nut assembly as recited in claim 12, wherein the ring structure comprises a compressible polymeric material.

14. The compression limiting nut assembly as recited in claim 13, wherein the ring structure comprises plastic.

15. The compression limiting nut assembly as recited in claim 13, wherein the ring structure comprises plastic.

16. A compression limiting nut assembly adapted to engage a threaded male member during attachment of a fastened component to a male threaded component, the compression limiting nut comprising:
    a unitary metal body of hollow construction, the body including a polygonal head portion adapted to engage a tightening tool and an integral nipple portion extending away from the head portion, the body having an open top and an open bottom with an axial passageway extending along the entire length of the body between the open top and the open bottom, the nipple portion including interior surface threads extending at least partially along the length of the nipple portion circumferentially about the axial passageway within the nipple portion, the body having a stepped exterior profile in the length dimension, wherein the head portion has an effective outer diameter greater than the outer diameter of the nipple portion and wherein the axial passageway has a stepped configuration with the effective inner diameter of the head portion being greater than the inner diameter of the nipple portion and wherein the head portion has a hollow walled construction with an interior unthreaded void between perimeter walls defining an upper portion of the axial passageway;
    a ring structure projecting radially outwardly from the exterior of the nipple portion and disposed circumferentially about the nipple portion; and
    a metal disc spring disposed in circumferential relation about the nipple portion at a position between the head portion and the ring structure, the disc spring having an annular conical construction including an upper neck and an enhanced diameter umbrella flange extending downwardly and radially away from the upper neck, wherein the umbrella flange intersects the upper neck at an elbow, the disc spring having an inwardly projecting interference structure defining the effective inner diameter for the disc spring which is less than the effective outer diameter formed by the ring structure on the nipple portion.

17. The compression limiting nut assembly as recited in claim 16, wherein the body is drawn steel.

18. A compression limiting nut assembly adapted to engage a threaded male member during attachment of a fastened component to a male threaded component, the compression limiting nut comprising:
    a unitary metal body of hollow construction, the body including a polygonal head portion adapted to engage a tightening tool and a substantially cylindrical nipple portion extending away from the head portion, the body having an open top and an open bottom with an axial passageway extending along the entire length of the body between the open top and the open bottom, the nipple portion including interior surface threads extending at least partially along the length of the nipple portion circumferentially about the axial passageway within the nipple portion, the body having a stepped exterior profile in the length dimension, wherein the head portion has an effective outer diameter greater than the outer diameter of the nipple portion and wherein the axial passageway has a stepped configuration with the effective inner diameter of the head portion being greater than the inner diameter of the nipple portion and wherein the head portion has a hollow walled construction with an interior unthreaded void between perimeter walls defining an upper portion of the axial passageway;
    a compressible ring structure projecting radially outwardly from the exterior of the nipple portion and disposed circumferentially about the nipple portion; and
    a metal disc spring disposed in circumferential relation about the nipple portion at a position between the head portion and the ring structure, the disc spring having an annular conical construction including an upper neck and an enhanced diameter umbrella flange extending downwardly and radially away from the upper neck, wherein the umbrella flange intersects the upper neck at an elbow, the disc spring having an inwardly projecting interference structure defining the effective inner diameter for the disc spring which is less than the effective outer diameter formed by the ring structure on the nipple portion, and wherein each side of the disc spring has a dogleg cross-sectional profile including a distal foot portion defining a substantially flat lower surface and an angled leg portion extending between the distal foot portion and the elbow.

19. The compression limiting nut assembly as recited in claim 18, wherein the body is drawn steel.

20. The compression limiting nut assembly as recited in claim 19, wherein the ring structure comprises a polymeric material.

* * * * *